United States Patent

[11] 3,630,169

| [72] | Inventor | Victor B. Corey<br>Bellevue, Wash. |
|---|---|---|
| [21] | Appl. No. | 41,886 |
| [22] | Filed | June 1, 1970 |
| [45] | Patented | Dec. 28, 1971 |
| [73] | Assignee | Sundstrand Data Control, Inc. |

[54] STALL WARNING INDICATOR
7 Claims, 2 Drawing Figs.

[52] U.S. Cl. .................................................. 116/117 D,
73/180, 116/124
[51] Int. Cl. .......................................................... G01f 15/00
[50] Field of Search............................................ 116/117,
114, 117.4, 112, 124; 73/180, 181, 189, 194;
137/81.5

[56] References Cited
UNITED STATES PATENTS
| 3,222,926 | 12/1965 | Carver........................ | 73/180 |
|---|---|---|---|
| 3,343,413 | 9/1967 | South et al.................. | 73/194 X |
| 2,637,295 | 5/1953 | Gehrig........................ | 116/117.4 |
| 2,753,835 | 7/1956 | Gehrig........................ | 116/124 |
| 3,111,291 | 11/1963 | Horton........................ | 137/81.5 |
| 3,452,707 | 7/1969 | Warren....................... | 116/117.4 |

Primary Examiner—Louis J. Capozi
Attorney—Hofgren, Wegner, Allen, Stellman & McCord ABSTRACT: A stall warning indicator having no moving parts is mounted on a leading edge of an aircraft wing, near the point of stagnation of airflow when a stall condition occurs. The indicator includes a transmitter emitting transmissions, as a continuous acoustic wave or a jet airstream, which are received by a pair of detectors connected to a differential sensor. When the stagnation point passes the axis of the transmissions, the differential sensor produces a signal to warn of an impending stall.

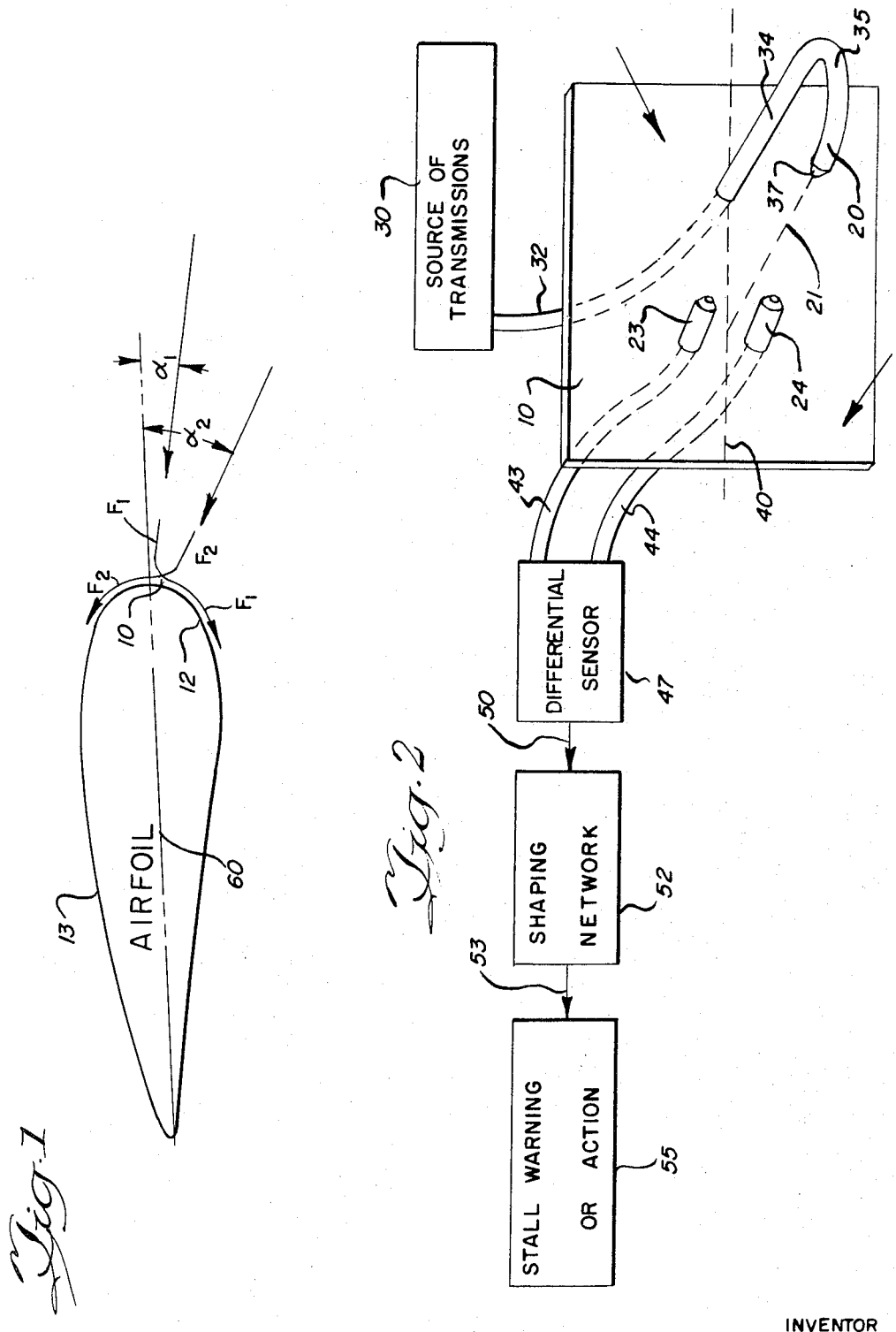

STALL WARNING INDICATOR

This invention is an improvement of the invention disclosed in my application "Direction and Velocity Determining Apparatus," Ser. No. 809,837, filed March 24, 1969 now U.S. Pat. No. 3,548,653.

This invention relates to a stall warning indicator of the type mounted on an airfoil located in an airstream.

Stall warning systems based on angle of attack sensing are advantageous over other types of stall warning indicators because the stall characteristics of an airfoil are typically well defined and stable with respect to angle of attack. Other indicators give less accurate warning because true airspeed, or even indicated airspeed, at which a given wing or a given aircraft will stall depends sharply on the load carried. Typical prior stall warning systems based on angle of attack have mounted a vane operated switch on the leading edge of an airfoil, near the stagnation point at which airflow divides when a stall condition is eminent. The mounting location is usually just prior to the stagnation point during a stall, in order to generate a warning in sufficient time to allow corrective action to be taken.

Movable vanes or other airflow movable elements used in prior stall warning systems have produced problems concerning reliability, wear, and susceptibility to damage. Also, such stall indicators have erratic performance at very slow airspeeds. While performance is generally reliable for most conventional aircraft, prior indicators are inadequate for use on vertical takeoff and landing craft (VTOL), short takeoff and landing craft (STOL), and helicopter-type aircraft. In aircraft of this type, the direction of travel, particularly at low speeds, may be along axes other than the main cord of the airfoil, and the airflow may move at greatly reduced speeds with respect to the speed of airflow normally associated with operation of vane-type stall warning indicators.

In accordance with the present invention, an improved stall warning indicator of the type mounted on the edge of an airfoil is disclosed which uses no moving parts. This greatly enhances the life and reliability of the indicator. In addition, the indicator has an amplifying operation, so that accurate stall warning is provided even when the airfoil is emersed in a relatively slow-moving airstream. Both an acoustic and a fluidic form of sensor are disclosed.

One feature of this invention is the provision of an improved stall warning indicator located on the leading edge of an airfoil and using no moving parts.

Another feature of this invention is the provision of an airfoil-mounted stall warning indicator sensitive to extremely slow-moving air masses.

A further feature of this invention is the provision of a stall warning indicator having a transmitter mounted on the leading edge of an airfoil to emit locally generated transmissions which impinge a pair of receivers mounted near the stagnation point at which airflow divides on the airfoil during a stall condition.

Further features and advantages of the invention will be apparent from the following description, and from the drawings, in which:

FIG. 1 is a cross-sectional view of an airfoil and incident airstream, illustrating the location for mounting the indicator; and FIG. 2 is a schematic diagram of the improved stall warning indicator of the present invention.

While an illustrative embodiment of the invention is shown in the drawings and will be described in detail herein, the invention is susceptible of embodiment in many different forms and it should be understood that the present disclosure is to be considered as an exemplification of the principles of the invention and is not intended to limit the invention to the embodiment illustrated. The scope of the invention will be pointed out in the appended claims.

Turning to FIG. 1, the stall warning indicator is assembled on a thin base plate 10 mounted on the leading edge 12 of an airfoil 13, such as an aircraft wing, which has an airstream incident thereon. Different directions of incident airstreams are indicated in FIG. 1 by the arrows $F_1$ and $F_2$.

The stall warning indicator, seen in FIG. 2, consists of a transmitter 20 for emitting transmissions 21 along an axis exposed to the airstream. A first detector 23 and a second detector 24 form a receiver for detecting the transmissions. The detectors are axially spaced from the transmitter 20 and located so that transmissions 21 equally impinge upon the detectors 23 and 24 when the airstream is not moving. The transmitter and receiver may take an acoustic or a fluidic form, and will first be explained in its fluidic form.

Transmissions 21, in the form of a jet airstream, are supplied by a source 30 of pressurized air. The source 30 is coupled via a tubular pipe 32 to transmitter 20, consisting of a tubular pipe having a section 34 perpendicularly extending from the outer surface of plate 10, and a curved section 35 terminating in a nozzle 37 which directs the jet stream perpendicularly downward back towards the plate 10. Curved section 35 defines a half circle, so that the axis of transmissions 21 perpendicularly intersects plate 10 along an axis 40 which includes the pipe section 34.

Detectors 23 and 24 of the receiver are located along an axis which perpendicularly intersects axis 40 and the axis of transmissions 21. The detectors are equally spaced from axis 40, so that the airflow from nozzle 37 is equally and symmetrically distributed between the pair of detectors. The detectors may be air pressure detectors of the type used in angle of attack sensors operating on the ram jet principle.

The detectors 23 and 24 are individually coupled through pipes 43 and 44, respectively, to a differential sensor 47 which is responsive to the difference in the pressure inputs to generate a differences signal coupled to an output line 50. This signal is shaped by a shaping network 52 in order to generate on an output line 53 a stall warning indication which is coupled to a utilization device 55. The device 55 may take several forms, and can consist of a simple visual or audible warning device, or may be part of an automatic control which is responsive to the stall warning indication to cause the aircraft to assume a safer angle of attack.

Plate 10 for mounting the stall warning transmitter and receiver is formed of thin sheet metal, chamfered at the edges. The dimensions of the plate 10 are typically about one-half inch square. Desirably, plate 10 is conformed to the contour of the leading edge 12 of the airfoil in order to preserve a streamlined configuration. Plate 10 is oriented so that the detectors 23 and 24 lie one above the other in a plane perpendicular to both the length and the main cord 60 of the airfoil 13, so that axis 40 is generally parallel to the length of the airfoil (which extends perpendicular to the plane of the cross-sectional view of the airfoil 13 in FIG. 1). The pipes 43 and 44 for connection to pressure sensors 23 and 24 are desirably enclosed by the airfoil surfaces, and are carried remotely to the other elements of the system.

Plate 10 is located on the leading edge 12 just prior to the stall stagnation point at which airflow divides and travels in opposite directions along the airfoil 13 during a stall condition. The exact mounting point is sufficiently prior to a stall condition to provide adequate warning in order to allow correction action to be taken. This point corresponds to the mounting point for known vane-type stall warning sensors.

In operation, when the airflow medium has a relative velocity vector which does not lie completely within the plane formed by axis 40 and the axis of transmission 21, then the jet stream from nozzle 37 is deflected out of a symmetrical distribution pattern. Differential sensor 47 is responsive to the excess pressure at either of the detectors 23 or 24 to generate a signal having a polarity determined by the algebraic difference between the pressures received at detectors 23 and 24. Thus, the sensor 47 discriminates between motions of the airflow which are upward and those which are downward with respect to the plane formed by axis 40 and the axis of transmissions 21. Because a small movement of the surrounding airstream will deflect the jet transmissions and produce a large pressure variation in detectors 23 and 24, an amplifying action occurs which makes the stall warning indicator suitable for aircraft such as VTOL, STOL, and helicopters.

The angle of attack $\alpha$ for airfoil 13 is the angle between the main cord 60 of the airfoil and the direction F at which the airflow is impinging the leading edge 12 of the airfoil. During normal flight conditions, such as represented by the angle of attack $\alpha_1$ in FIG. 1, the streamlines of airflow pass over the airfoil along a path such as $F_1F_1$ in FIG. 1 and continue on under the wing. This direction of flow causes the jet of gas issuing from nozzle 37, FIG. 2, to be deflected toward detector 24 and away from detector 23, producing a signal on output line 50 which has a particular algebraic sign, such as negative.

When the incident angle of attack $\alpha_2$ of the remote airstream increases to a value in which a stall warning is to be generated, the local direction of airflow reverses and takes a path $F_2F_2$, in which the airflow continues up over the airfoil 13. This change in direction of flow causes the jet stream from nozzle 37, FIG. 2, to be deflected away from detector 24 and towards detector 23, resulting in an abrupt change in algebraic sign of the signal output, from negative to positive. The change in polarity causes network 52 to generate a stall warning signal. While change of polarity of the signal on line 50 has been used to generate a stall warning, other types of changes, as from one output phase to another output phase, may also be utilized.

Transmitter 20 and receivers 23 and 24 may alternately take an acoustic form rather than the fluidic form just described. Source 30, in such an instance, would be an electrical transmitter which, by a suitable electrical transmission medium 32, couples locally generated oscillations of low frequency to a transducer 37 to emit an acoustic wave along axis 21. Detectors 23 and 24 are acoustic receivers responsive to the received acoustic wave to couple corresponding electrical signals through suitable electrical transmissions mediums 33 and 34 to the differential sensor 47.

As more fully explained in my copending application, Ser. No. 809,837, now U.S. Pat. No. 3,548,653, to which reference should e made, an airstream incident on an acoustic wave alters the transmission pattern of the wave. As a result, the transit times between the transducer 37 and the detectors 23 and 24 differs. Differential sensor 47 may be any suitable differential amplifier which is responsive to a change in phase of the signals received at detectors 23 and 24 in order to produce a change in the electrical output signal on line 50. The operation of the acoustic sensor is thus substantially the same as that previously described for the fluidic sensor. If desired, source 30 may also be coupled to sensor 47 in order to provide the necessary information for synchronous detection of the signals from detectors 23 and 24. Such synchronous detection, as is well known, eliminates the detection of spurious signals.

The above-described indicator, either of the fluidic or acoustic form, produces an airfoil mounted stall warning indicator using no moving parts. Because the transmitter 20 as well as the detectors 23 and 24 are rigidly attached to the base plate 10, problems of wear and damage are substantially eliminated.

I claim:

1. A stall warning indicator for an airfoil in an incident airstream, comprising:

transmitter means for emitting transmissions along an axis exposed to said airstream, said transmissions deviating in direction from said axis when the airstream is incident at an angle to said axis;

receiver means axially spaced from said transmitter means for detecting said transmissions and producing a signal output, said signal output varying as the transmissions deviate in direction from said axis;

means fixedly mounting said transmitter means and said receiver means to said airfoil with said axis of transmissions being located in a disturbed airstream adjacent the airfoil and near a stagnation point at which the disturbed airstream direction changes on said airfoil when a stall condition occurs; and means coupled to said receiver means and responsive to a predetermined signal output for producing a stall warning indication.

2. The stall warning indicator of claim 1 wherein said receiver means includes first and second transmissions sensitive means, said mounting means fixedly mounting said first and second transmissions sensitive means on symmetrical sides of said axis so that the signal output of said first and second means are substantially equal, and said means coupled to said receiver means comprises differential means coupled to said first and second transmissions sensitive means and responsive to unequal signals of predetermined characteristic for producing said stall warning indication.

3. The stall warning indicator of claim 2 wherein said transmitter means includes a source of pressurized fluid, nozzle means connected to said source for emitting a jet fluid stream along said axis, said first and second transmissions sensitive means being responsive to fluid pressure to produce signal outputs proportional thereto.

4. The stall warning indicator of claim 2 wherein said transmitter means emits sonic vibrations which forms said transmissions, said first and second transmissions sensitive means comprising sonic vibration sensitive means responsive to said sonic vibrations for generating signal outputs proportional thereto.

5. The stall warning indicator of claim 1 wherein said mounting means includes a generally tubular housing having a first section extending outward from said airfoil and a contiguous curved section terminating in means for directing the transmissions inward towards said airfoil, and said receiver means includes detector means extending outward from said airfoil for a lesser extent than said tubular housing and located generally under said directing means.

6. The stall warning indicator of claim 5 wherein said detector means comprises a plurality of transmission-sensitive devices each mounted on said airfoil at spaced locations arranged in a symmetrical pattern under the directing means of said transmitter means.

7. The stall warning indicator of claim 6 wherein said means coupled to said receiver means comprises differential means coupled to said plurality of devices and responsive to a change in received transmissions for producing said stall warning indication.

* * * * *